Patented Feb. 10, 1942

2,272,488

UNITED STATES PATENT OFFICE 2,272,488

PROCESS FOR THE PRODUCTION OF ZEIN

Lloyd C. Swallen, Pekin, Ill., assignor to Corn Products Refining Company, New York, N. Y., a corporation of New Jersey No Drawing. Application July 31, 1939, Serial No. 287,619

3 Claims. (Cl. 260—123)

This invention relates to the production of zein, the alcohol soluble part of corn (maize) protein, and more particularly to the removal of oil and coloring matter from an extract obtained by extracting the zein with ethyl alcohol.

The object of the present invention is to provide a method of producing zein wherein the solvent for zein is ethyl alcohol and the solvent for oil and coloring matter in the zein extract is a petroleum hydrocarbon.

It has heretofore been proposed to utilize certain petroleum hydrocarbons, such as hexane, to remove oil and coloring matter from alcohol solutions of zein instead of the more commonly employed aromatic hydrocarbons such as benzol and toluol, which latter solvents, under certain conditions, are relatively objectionable because of their toxicity and the difficulty of solvent recovery. However, it has been the common belief in the art that the use of hexane or equivalent petroleum hydrocarbons for the extraction of oil and coloring matter could not be satisfactorily performed with ethyl alcohol extracts because of the poor separations obtained.

The present invention is based upon the discovery that hexane and certain other petroleum hydrocarbons may be satisfactorily employed as a solvent for oil and coloring matter in ethyl alcohol solutions of zein provided that the conditions are kept within a very narrow range.

According to one of the known methods of producing zein, ethyl alcohol in concentrations between 86% and 92% by volume is heated to approximately 60° C. (120° F.) and mixed in a suitable extractor with gluten meal, the amount of the alcohol varying between two and five times the weight of the meal, the preferred amount being 3.5 times. The extract is then cooled to about 15° C. (59° F.) and filtered upon a suitable filter, such for example as an Oliver precoat vacuum filter. The filtrate (zein-alcohol solution containing oil and coloring matter) is then mixed with a solvent for the oil and coloring matter to effect a primary separation thereof. Most of the solvent, oil and coloring matter are then removed by a centrifugal or gravity separation or other suitable means. The alcohol solution of zein is then heated by alcohol vapors and treated in a solvent flasher, operating in a vacuum, the temperature being such to cause the vaporization and removal of residual solvent which, after condensation, is preferably returned to the recovery system.

The zein solution is then precipitated by contact with water, subjected to a dispersing treatment and then spray dried.

According to the present invention hexane or other petroleum hydrocarbon is employed as a solvent for oil and coloring matter in the ethyl alcohol extract. However, in order to obtain a satisfactory separation with such solvents, it is necessary that the concentration of the ethyl alcohol employed in the extraction separation be not less than 92% nor more than 93%, by volume, and the amount of petroleum hydrocarbon employed be limited, preferably, to 30%–40%, by volume, of the zein extract.

The use of ethyl alcohol of less than 92% concentration will effect a separation of the mixture into not only a top layer containing a solution of alcohol and oil and coloring matter and a bottom layer of zein and alcohol (together with small amounts of water and petroleum hydrocarbon) but, in addition, a middle layer or phase containing excessive amounts of protein together with alcohol and some oil solvent. In other words, if the concentration of the alcohol is less than 92%, by volume, the solution will produce a three phase system which is difficult to separate. On the other hand, if the alcohol concentration is higher than 93% the zein yield will be reduced to an undesirable extent. The use of the petroleum hydrocarbon in an amount in excess of 40% of petroleum hydrocarbon, by volume, of the zein extract will also produce the undesirable three phase system and if less than 30% hydrocarbon, by volume, of the zein extract is employed, there will be an incomplete precipitation of the zein.

For most satisfactory results the petroleum hydrocarbon employed should have a boiling point of from 40° to 120° C., preferably 64°–70° C. That is, the boiling point should not be higher than practical for ready removal from the heavy zein solution nor lower than practical for ease in handling.

The following example, which is purely typical and informative, (the present invention being applicable within the limitations set forth to any desired method of mixing the materials and separating the phases) illustrates the application of the present invention to the extraction process above described.

*Example.*—200 grams of gluten meal containing 50% of protein was extracted at 60° C. with 800 cc. of 92% by volume ethyl alcohol. The resultant 600 cc. of extract, which contained approximately 6 grams of protein per 100 cc. was then treated with hexane in an amount equivalent to 40%, by volume, of the extract, i. e. 240 cc. of hexane. The mixture separated into two layers, the lower consisting of a solution of zein in alcohol and having a volume of 84 cc. (14% of the original volume of the extract) and the upper layer consisting of the remainder of the solvents used in the process, the oil and coloring matter extracted with the zein from the gluten meal, and 2 grams of protein (.25 gram per 100 cc.). The two layers were then separated and the zein was recovered by the usual procedures.

It is the intention to cover all variations and modifications within the scope of the appended claims.

I claim:

1. Process of obtaining zein from corn gluten which comprises: extracting the zein with ethyl alcohol of a concentration of 92%–93%, by volume, to provide a zein solution containing oil and coloring matter; mixing with the solution a petroleum hydrocarbon having a boiling point between 40° C. and 120° C., both inclusive, and in an amount within the range of 30% and 40%, by volume, of the zein extract; and separating the resultant supernatant solvent mixture containing oil and coloring matter from the concentrated alcoholic zein solution.

2. Process of obtaining zein from corn gluten which comprises: extracting the zein with ethyl alcohol of a concentration of 92%–93%, by volume, to provide a zein solution containing oil and coloring matter; mixing with the solution hexane in an amount equivalent to 30%–40%, by volume, of the zein extract; and separating the solvent mixture containing oil and coloring matter from the concentrated alcoholic zein solution.

3. Process of obtaining zein from corn gluten which comprises: extracting zein with ethyl alcohol of 92%–93% concentration (by volume) at substantially 60° C., cooling the resulting solution, mixing with the solution hexane in an amount equivalent to substantially 30%–40% by volume of the extract; separating the supernatant solvent mixture containing oil and coloring matter, and heating the remaining alcoholic zein solution to remove the residual hexane.

LLOYD C. SWALLEN.